(12) United States Patent
Satoh et al.

(10) Patent No.: US 6,843,440 B2
(45) Date of Patent: Jan. 18, 2005

(54) TAPE CARTRIDGE PRODUCING AND METHOD THEREOF

(75) Inventors: Takateru Satoh, Tokyo (JP); Motohiko Shima, Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/402,326

(22) Filed: Mar. 28, 2003

(65) Prior Publication Data

US 2004/0031871 A1 Feb. 19, 2004

(30) Foreign Application Priority Data

Mar. 29, 2002 (JP) .................................... 2002-093488

(51) Int. Cl.⁷ ............................................. G11B 23/107
(52) U.S. Cl. .................................. 242/348.2; 360/132
(58) Field of Search ............................ 242/348, 348.2; 360/132

(56) References Cited

U.S. PATENT DOCUMENTS 6,488,223 B1 * 12/2002 Hayashi ...................... 242/348

FOREIGN PATENT DOCUMENTS

JP    11-328922    11/1999

* cited by examiner

Primary Examiner—John Q. Nguyen
(74) Attorney, Agent, or Firm—Darby & Darby (57) ABSTRACT

This tape cartridge includes a tape reel on which a sheet-like recording medium is wound in the inside. A door member for opening and closing an opening in order to pull out the sheet-like recording medium from the tape reel to an outside is biased using a spring member so as to be closed upon non-using and opened upon using. The spring member is pushed in the concave fitting portion provided at the door member from the tip part and fitted therewith. When the tape cartridge is produced, the spring member can be temporally assembled, readily and securely. According to this tape cartridge, assembling performance of the spring member which biases the door member for opening and closing the opening and the door member can be enhanced, the assembly process can be automated, and there is no interference with sliding motion of the door member.

10 Claims, 8 Drawing Sheets

PRIOR ART

Fig. 7

PRIOR ART

Fig. 8

TAPE CARTRIDGE PRODUCING AND METHOD THEREOF

BACKGROUND OF THE INVENTION

1. Field of the Invention

The present invention relates to a one-reel typed tape cartridge used for a magnetic recording and reproducing apparatus and a method of producing the same.

2. Description of the Prior Art

A one-reel typed tape cartridge used for a magnetic recording and reproducing allows an opening portion of a case to be opened and closed using a door member in order to pull out and encase the tape. Conventional arts as to such a door member will be explained, referring to FIG. 6 and FIG. 7.

Figure 6:
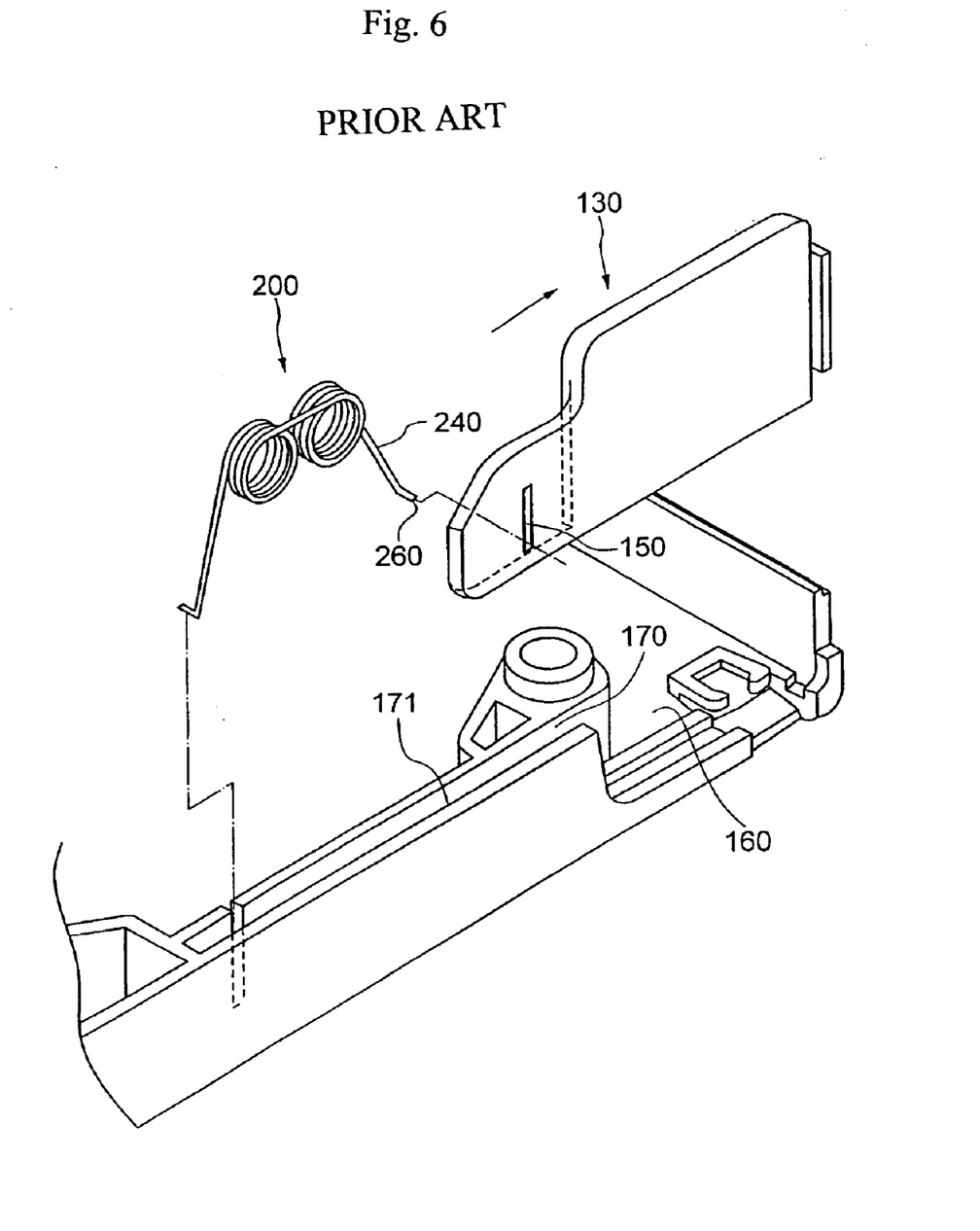
FIG. 6 is a perspective view showing a configuration of the door member and the spring member in the conventional tape cartridge.

In the conventional art in FIG. 6, a door member 130 which opens and closes an opening 160 of a tape cartridge is biased in a direction designated by an arrow of the drawing using a torsion-coil typed spring member 200 so as to always close the opening 160. At the door member 130, an elongate spring-hook-opening 150 is formed in a vertical direction on the drawing being normal to the biasing direction so that a stopper 260 of a spring arm 240 at one end of the spring member 200 is engaged with the door member 130. After the stopper 260 of the spring member 200 is inserted into the elongate spring-hook-opening 150 of the door member 130, the door member 130 is slidably incorporated into a thin and elongate recess 170 extended in a longitudinal direction of the door member 130 from the opening portion 160 (refer to Japanese Laid-open application No. 11-328922).

Figure 7:
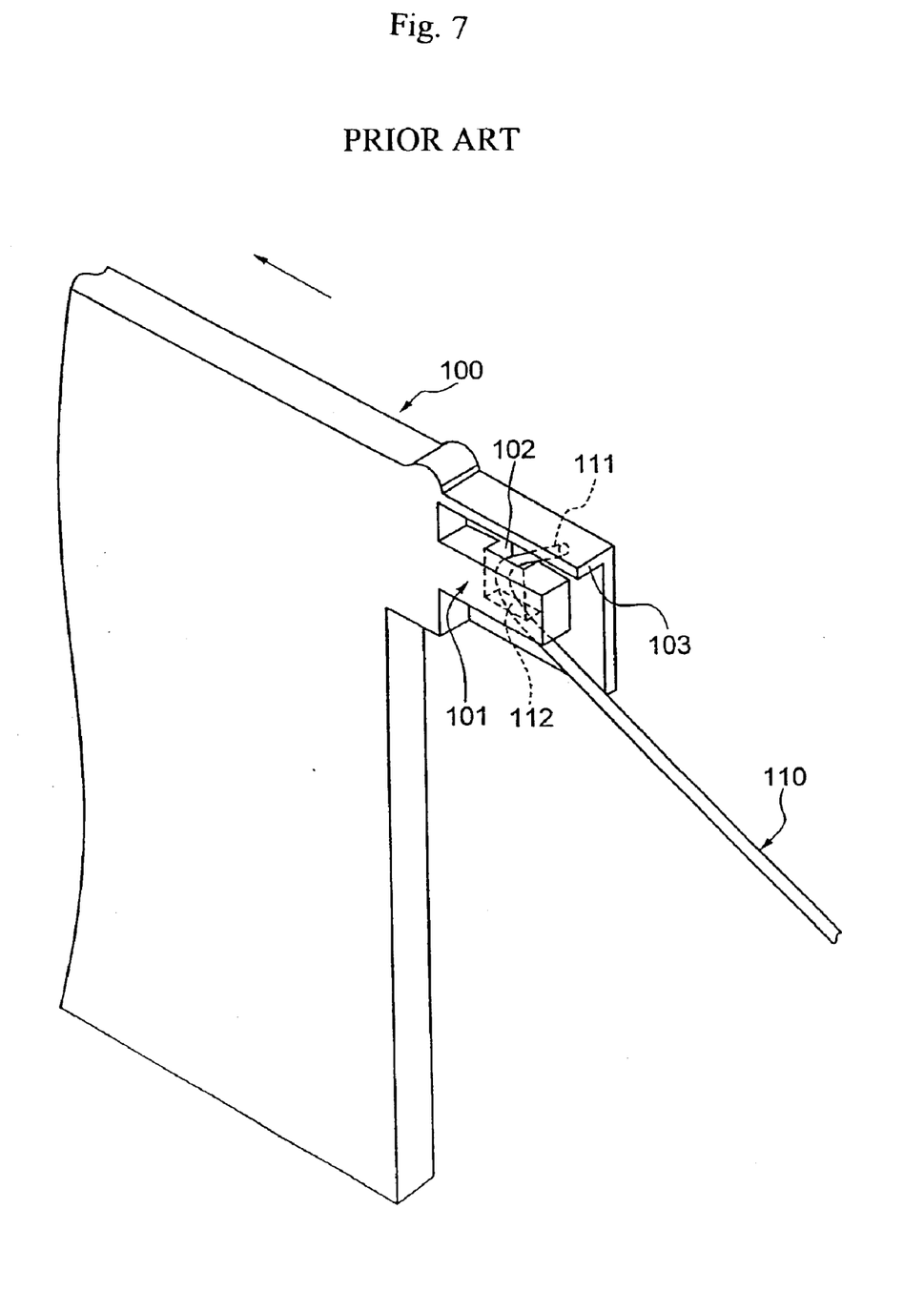
FIG. 7 is a perspective view showing another configuration of the door member and the spring member in the conventional tape cartridge.

Further, in another conventional art in FIG. 7, a door member 100 which opens and closes an opening of a tape cartridge (like the opening shown in FIG. 6) is biased using a spring member 110 in a direction designated by an arrow in the drawing so as to always close the opening. An inserting opening 102 is formed in a vertical direction of the drawing at a connecting portion 101 of one end portion of the door member. A curved portion 112 is formed at a tip part of the spring member 110. The spring member 110 is inserted into the inserting opening 102 of the door member 100 from its end portion 111 from below in the drawing, and then the curved portion 112 is positioned within the inserting opening 102. Thus, after the spring member 110 is hooked to the connecting portion 101 to establish a temporal assembling state, the door member 100 is incorporated into the cartridge case.

However, in the conventional example of FIG. 6, when the spring member 200 and the door member 130 lie in the temporal assembling state, it becomes difficult to hold the temporal assembling state. Therefore, the temporal assembling operation needs to be completed just before incorporating them into the cartridge case, so that the working becomes complicated and the assembling performance becomes worse. If the length of the stopper 260 at the tip part of the spring arm 240 of the spring member 200 becomes longer owing to faulty to be occurred upon bending it, when the door member 130 is slid within the recess 170 for opening and closing the door member 130, the stopper 260 will be contacted with an inner wall 171 of the recess, resulting that sliding defect of the door 130 occurs and further the inner wall 171 is injured with scratching.

Further, in the conventional example of FIG. 7, in the assembling operation that the spring member 110 is inserted from the end portion 111 into the inserting opening 102 of the door member 100, the spring member 110 is thin and further a tip part thereof has the curved portion 112 and the inserting opening 102 is also relatively small, resulting in that the assembling performance becomes worse and this operation cannot be automated i.e. must be performed by a hand. Therefore, more producing cost will be required. Additionally, the inserting opening 102 is relatively large under the temporal assembling state between the spring member 110 and the door member 100, so that the end portion 111 is sometimes unexpectedly released from the inserting opening 102, depending on its handling manner. Then the operation needs to be again performed, resulting in causing non-efficiency.

SUMMARY OF THE INVENTION

The object of the present invention is to provide a tape cartridge in which assembling performance of a spring member and a door member is improved, the spring member biasing the door member for opening and closing an opening portion, the assembly can be automated, and any trouble does not occur upon sliding of the door member.

Another object of the present invention is to provide a producing method of producing such a tape cartridge.

A tape cartridge according to the embodiment comprising: a tape reel around which a sheet-like recording medium is wound; a door member for opening and closing an opening through which the recording medium is pulled out from the tape reel; a spring member for biasing the door member to close the opening when the cartridge is not used, wherein the door member is provided with a concave fitting portion with which a tip part of the spring member is pushed and fitted.

According to this tape cartridge, the spring member is pushed in the concave fitting portion from the tip part to be fitted with the door member, resulting in that assembling performance of the spring member and the door member can be enhanced and the assembly process can be automated, and further there is no interference with sliding when the door member is opened and closed.

The concave fitting portion is constituted so that the tip part is fitted therewith because the concave fitting portion is elastically deformed when the tip part of the spring member is pushed in. Thus, the spring member can be fitted therewith by elastic deformation at the fitting portion.

The concave fitting portion has a convex portion formed so that a space where the tip part is pushed in is partially narrow in its width, resulting in that when the spring member is pushed in from the tip part, the spring member can be elastically deformed and fitted at a convex narrow-width space.

Preferably, the spring member is constructed of wire material and the width of a space which is normal to a direction where the tip part is pushed in, is smaller than a diameter of section of the spring member in the space where there exists said convex portion, and larger than the diameter of section of the spring member in a space except for the convex portion, resulting in that the spring member can be readily fitted therewith.

In this case, preferably, the concave fitting portion has a wide-width space whose width is wider than the width of the convex portion so that the tip part of the spring member can be freely moved when fitted over the convex portion.

The concave fitting portion has an abutting wall to which the tip part of the spring member is abutted in a biasing direction of the door member by the spring member, resulting in that the spring member always biases the door member in one direction.

The concave fitting portion has a detach-preventing wall for preventing the tip part of the fitted spring member from being detached from the fitting portion, resulting in that unexpectedly pulling the spring member out from the fitting portion can be securely prevented.

A method of producing a tape cartridge according to the present embodiment comprising the steps of: temporally assembling the spring member to the door member by pushing in the spring member from the tip part of the spring member to the fitting portion; and next incorporating the door member into the cartridge case.

According to this method of producing the tape cartridge, the spring member can be readily and temporally assembled to the door member by pushing in the spring member from the curved portion of the tip part into the fitting portion, resulting in that the temporal assembling process can be automated. Additionally, the temporal assembling state can be securely held, resulting in that the automated assembly process in which the door member is incorporated into the cartridge case can be securely performed. Thereby, the producing cost of the tape cartridge can be reduced.

DETAILED DESCRIPTION OF THE PREFERRED EMBODIMENTS

Figure 1:
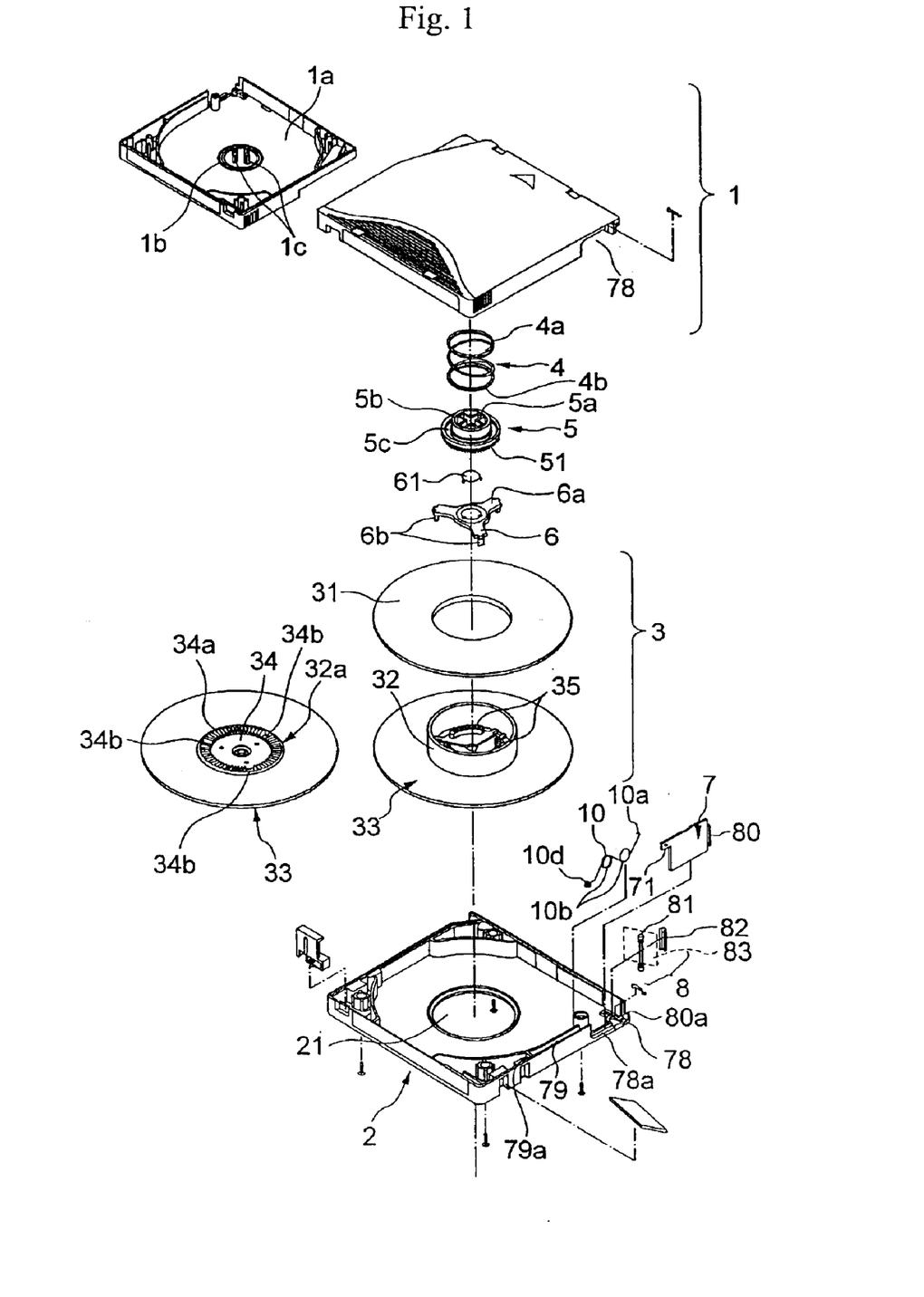
FIG. 1 is an exploded view in perspective of a tape cartridge according to the present embodiment.
Figure 2:
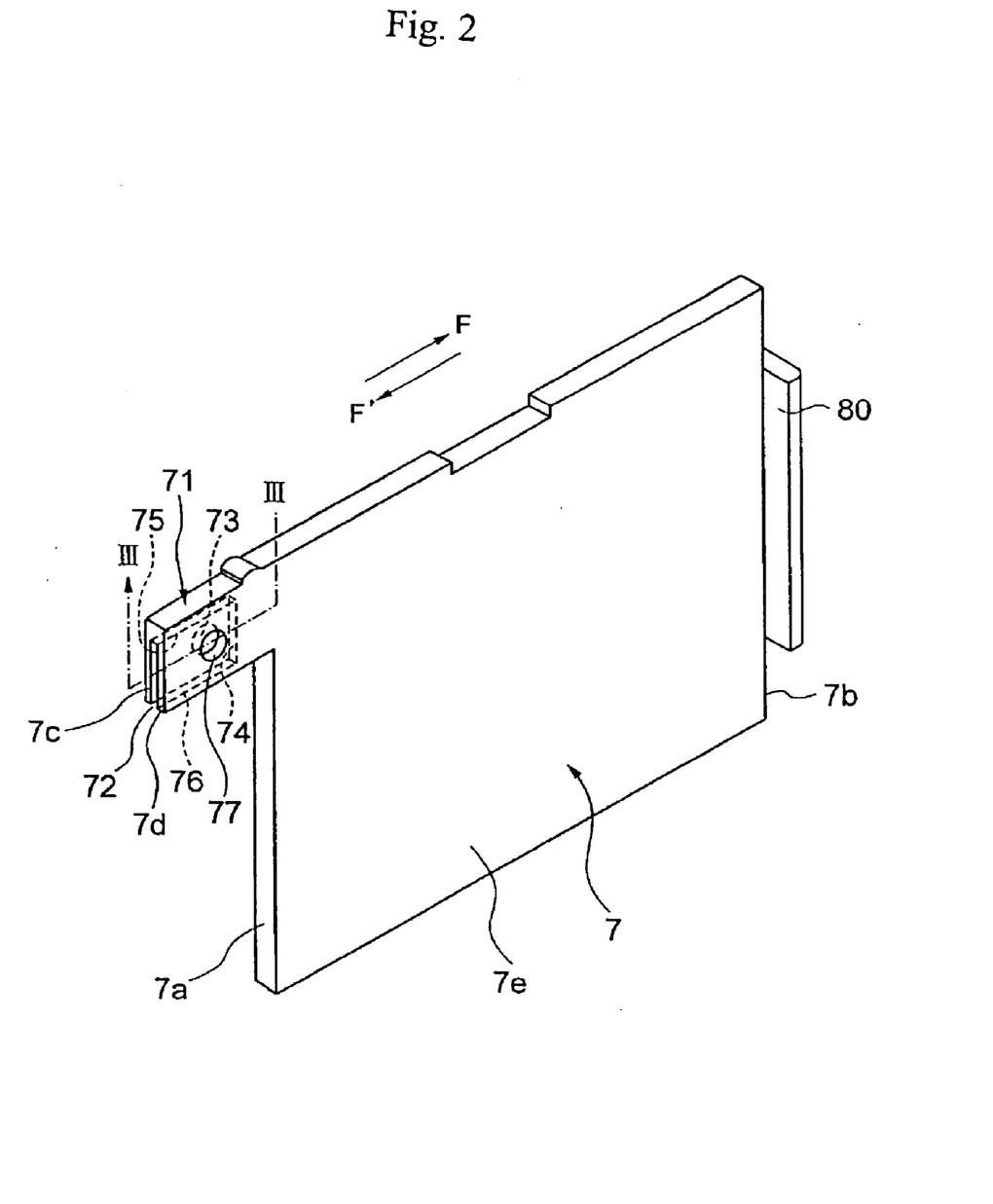
FIG. 2 is a perspective view showing a door member of the tape cartridge in FIG. 1.
Figure 3:
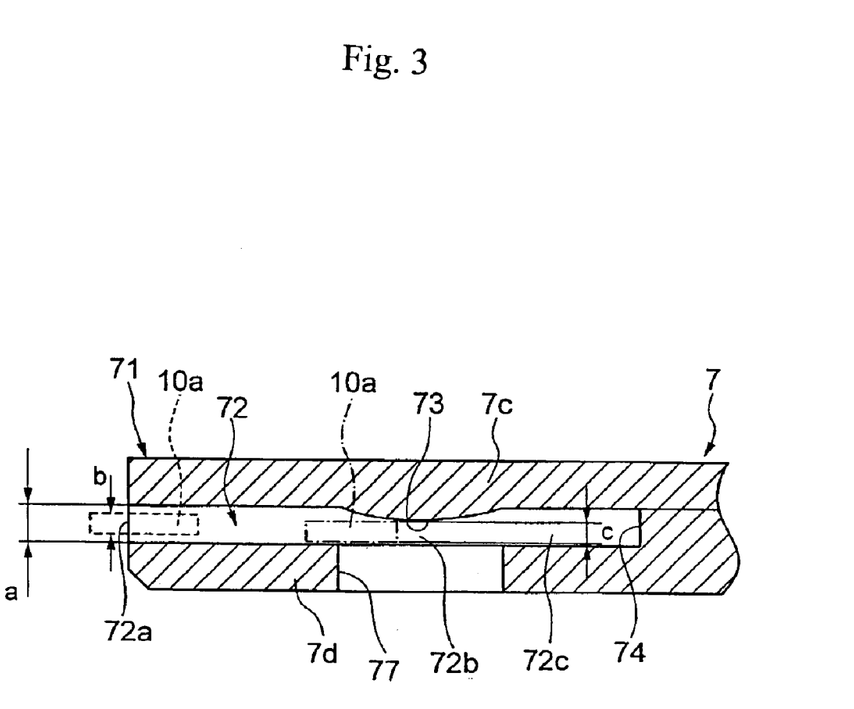
FIG. 3 is a sectional view which is seen by cutting out a fitting portion of the door member in FIG. 2 along line III—III.
Figure 4:
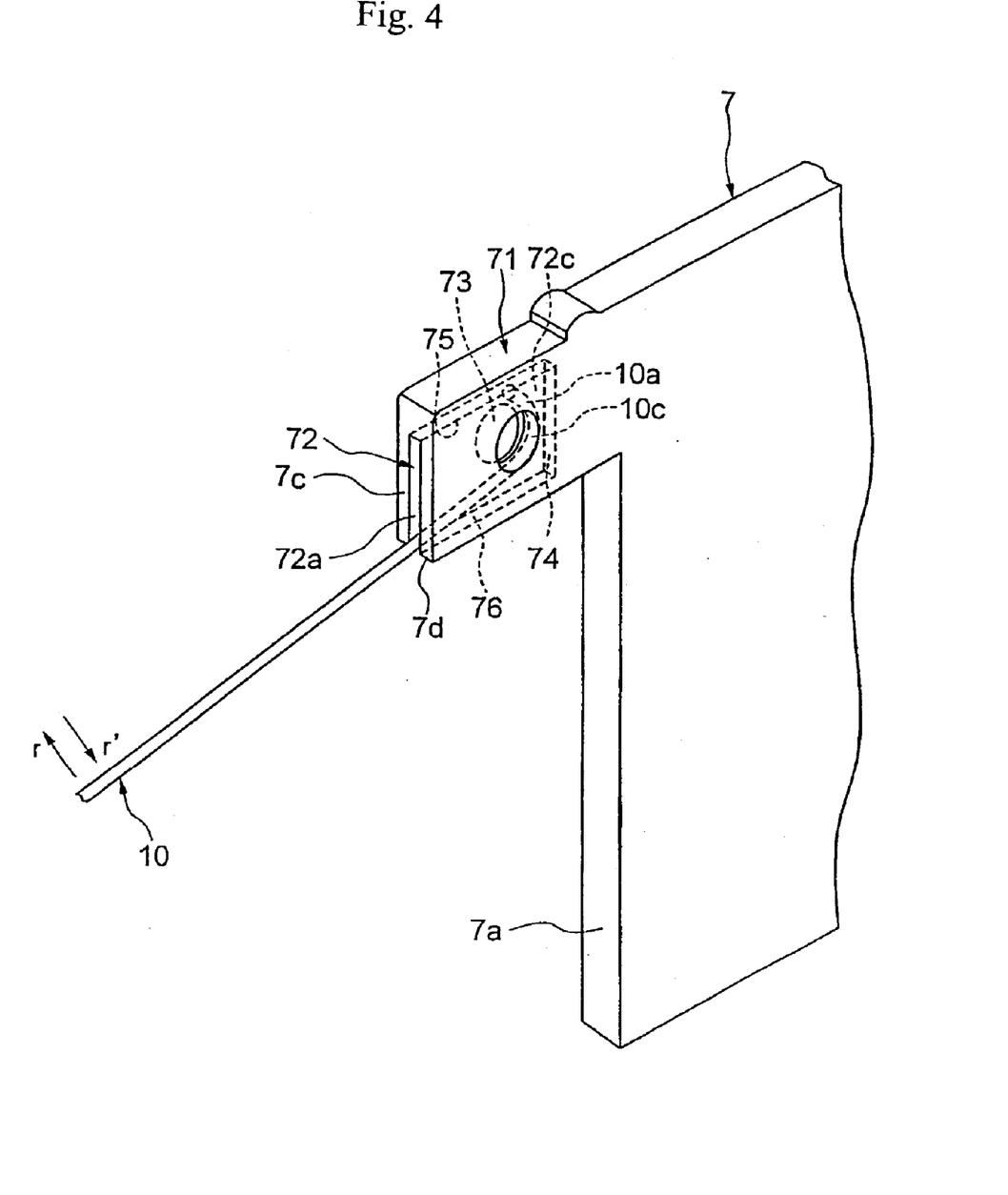
FIG. 4 is a perspective view showing a state where one end portion of a spring member is fitted to the door member in FIG. 2.

Hereinafter, description will be explained about the embodiment of the present invention, referring to the drawings. FIG. 1 is an exploded view in perspective of the tape cartridge according to the embodiment of the present invention. FIG. 2 is a perspective view showing a door member of the tape cartridge in FIG. 1. FIG. 3 is a sectional view seen by cutting out a fitting portion of the door member in FIG. 2 along line III—III. FIG. 4 is a perspective view showing a state where one end portion of a spring member is fitted to the door member in FIG. 2. Note that FIG. 1 also shows a perspective view in which the upper case 1 and the hub portion 32 are seen from the reverse side of FIG. 1.

The tape cartridge in FIG. 1 is constituted in a rectangular-and-plane-shaped one-reel type manner, which is provided with the upper case 1 and a lower case 2. The tape cartridge has a tape reel 3 on which a magnetic recording tape is wound, at the inside. When mounted to a recording and reproducing apparatus, the tape cartridge is constructed so that the tape reel 3 can be rotated. The upper case 1 and the lower case 2 can be integrally produced by molding process using resin material.

The tape reel 3 is provided with an upper flange 31, a lower flange 33, and a hub portion 32 which is formed integrally with the lower flange 33 and on a circumferential surface of the hub portion 32, a sheet-like magnetic recording medium is wounded. As shown in FIG. 1, a circle-shaped metal plate 34 made of soft magnetic material is provided integrally with a lower surface 32a of the hub portion 32. Engaging teeth 34a which are engaged with the teeth portion of a driving axle (unshown) of the recording and reproducing apparatus are provided at the periphery of the metal plate 34, which are divided into three sections in its circumferential direction. A plurality of holes 34b penetrate through the reverse surface to the lower surface 32a between the engaging teeth 34a. The metal plate 34, the engaging teeth 34a, and the plurality of holes 34b penetrate through a penetrating hole 21 of the lower case 2 to be exposed for an outside.

As shown in FIG. 1, the brake-locking member 5 is provided with the circular teeth portion 51 which is arranged at the inside of the hub portion 32 and which is mated and engaged with the teeth portion 35 of the hub portion 32, a cross-shaped engaging opening 5a formed at an end surface of a cylinder whose diameter is smaller than the teeth portion 51, an end portion 5b at the periphery of the cross-shaped opening 5a, and a ring-shaped recess 5c formed so that an end portion 4b of the brake-locking spring 4 is accommodated at the reverse surface side of the teeth portion 51.

As shown in FIG. 1, the brake-locking spring is incorporated so that one end 4a of the brake-locking spring 4 is accommodated at a ring-shaped recess 1b formed at a substantial center of an inner surface 1a of the upper case 1 while the other end 4b thereof is accommodated at the ring-shaped recess 5c of the brake-locking member 5. The brake-locking member 5 is mounted to the upper case 1 so that a plurality of engaging projecting portions 1c being provided so as to be upright to an inner surface 1a of the upper case 1 are inserted into the cross-shaped hole 5a, so as to be movably engaged in a vertical direction of the drawing. The brake-locking spring 4 is arranged between the ring-shaped recess 5c and the ring-shaped recess 1b at the inside surface 1a of the upper case 1, in which the brake-locking member 5 is always biased downwardly in the drawing so that the teeth portion 51 and the teeth portion 35 of the hub portion 32 are mutually mated and engaged, resulting in that the brake-locking member 5 lies at a locking position to prevent the tape reel 3 from being rotated.

A brake-releasing member 6 is arranged between the hub portion 32 and the brake-locking member 5 and which is provided with a main plate 6a and a plurality of leg portions 6b projected downwardly in the drawing from a plurality of portions at the periphery of the main plate 6a. The plurality of the leg portions 6b are inserted into a plurality of openings 34b at a lower surface of the hub portion 32. When the tape cartridge is mounted to the recording and reproducing apparatus, then the leg portions 6b of the brake-releasing plate 6 are pushed from below in the drawing to be lifted upwardly. Thereby, the brake-locking member 5 is, by way of a pressure equalizing plate 61 of the brake-releasing plate 6, lifted upwardly against a biasing force of the brake-locking spring 4 and moved to an unlocked position, so that the end portion 5b is abutted on the inner surface 1a.

According to the tape cartridge in FIG. 1, the brake-locking member 5 lies in a locking position during unused time such as a preserving time, and the teeth portion 51 of the brake-locking member 5 and the teeth portion 35 of the hub portion 32 are mutually mated and engaged, resulting in that the tape reel 3 cannot be rotated and unexpected rotation is prevented, so that slacking of the magnetic recording tape and the like can be prevented.

A tip end 83 (represented by a dotted line in FIG. 1) of the magnetic recording tape wound on the tape reel 3 is fixed to a leader member 8. At the leader member 8, a tip end 83 of the magnetic recording tape is wound on a pin member 81. The leader member 8 is fixed by fitting a C-shaped clamp 82 therewith from above. When the tape cartridge is mounted to the recording and reproducing apparatus, then the leader member 8 is held by a holding member at the apparatus side and the tape is pulled out from an opening portion 78 for pulling out the tape to the apparatus side.

The above-mentioned opening portion 78 is formed at the upper case 1 and the lower case 2, and opened and closed by a door member 7. The door member 7 is, as shown in FIG. 1 and FIG. 2, constituted by a substantial rectangular flat plate and provided with a fitting portion 71 which is projected toward one end portion 71 and fitted by pushing in an end portion 10a of a spring member 10 and an engaging portion 80 which is projected toward the outside of the case at the other end portion 7b so as to be engaged with an opening member (unshown) at the side of the apparatus when mounted to the recording and reproducing apparatus.

The spring member 10 is made of liner material and has a plurality of torsion coil portions 10b and a curved portion 10c which is curved at the end portion 10a. And, as shown in FIG. 1, the spring member 10 is accommodated within a recess 79 of the lower case 2, and biases the door member 7 in a biasing direction F so as to always close the opening portion 78. The door member 7 can be slid in the biasing direction F and in the opposite direction F' while being guided within a recess 78a and a recess 79 of the lower case 2 and same recesses as the recesses 78a, 79 of the upper case 1 (unshown).

As shown in FIG. 1 to FIG. 3, the fitting portion 71 of the door member 7 is constituted in a concave manner so that a slit-shaped cut-out portion is provided from a substantial center portion in the width direction of the flat plate. And the door member 7 comprises a space portion 72 in which the end portion 10a of the spring member 10 is pushed in and positioned, a convex portion 73 formed so as to be partially projected in a dome-shaped manner at the space portion 72, an abutting wall 74 which is abutted on the spring member 10 when the end portion 10a of the spring member 10 biases the door member 7, a detach-preventing wall 75 on which the end portion 10a of the spring member 10 is abutted so that the end portion 10a is not detached upwardly in FIG. 2, and a thin and elongate opening 76 formed at below portion in the drawing so as to oppose to the detach-preventing wall 75.

Thin portions 7c, 7d are formed at both sides of the space portion 72 formed at the fitting portion 71. The thin portions 7c, 7d can be elastically deformed in a direction where the space portion 72 in FIG. 3 is widen. Additionally, a circular opening 77 is formed, opposing to the convex portion 73. The opening 77 is formed using a slide core used for a metal mold for molding the convex portion 73.

As shown in FIG. 3, the space portion 72 of the fitting portion 71 includes an inserting portion 72a which is opened at an end surface so that the tip part 10a of the spring member 10 can be inserted thereinto, a narrow-width portion 72b in which the width of the space portion 72 is narrow because there exists the convex portion 73, and a wide-width portion 72c which is positioned at the deepest location of the space portion 72 and whose width is substantially as wide as the inserting portion 72a. Here, if a width of the space portion 72 at the inserting portion 72a and the wide-width portion 72c (width of a space normal to the direction where the tip part 10a is pushed in) is designated by a, a diameter of the linear material of the spring member 10 is designated by b, and a width of the space portion 72 at the narrow-width portion 72b (i.e., minimum portion) designated by c, the relationship among a, b, and c is preferably satisfied with: a>b>c.

Next, an assembly process for the spring member 10 and the door member 7 when the tape cartridge in FIG. 1 to FIG. 4 is produced will be explained. Firstly, the spring member 10 as shown in FIG. 1 is inserted from the tip part 10a into the inserting portion 72a of the door member 7 as represented by the dotted line in FIG. 3. Then, the width a of the inserting portion 72a is larger than the diameter b of the spring member 10, resulting in that the spring member 10 can be inserted thereinto without any resistance.

Secondly, at the narrow-width portion 72b having the convex portion 73 as represented by one-dotted line in FIG. 3, the width c of the narrow-width portion 72b is smaller than the diameter b of the spring member 10, so that the tip part 10a of the spring member 10 is abutted on the convex portion 73, which causes resistance for the insertion of the tip part 10a. But, when the spring portion 10 is more strongly pushed thereinto, the thinner portions 7c, 7d of the fitting portion 71 are elastically deformed by the pushing force, so that the width of the narrow-width portion 72b is widened. As a result, the tip part 10a of the spring member 10 arrives at the deepest wide-width portion 72c over the convex portion 73.

As above-mentioned, such fitting operation can be readily established by pushing the tip part 10a of the spring member 10 into the space portion 72 of the fitting portion 71. Therefore, the spring member 10 can be readily and temporally assembled to the door member 7, so that the assembling performance of the spring member 10 and the door member 7 can be enhanced and the temporal assembling process can be automated by a robot arm of an automatic assembly machine. Accordingly, the producing cost of the tape cartridge can be more reduced than conventional.

Next, the above-mentioned door member 7 in a temporal assembling state is incorporated into the lower case 2 so as to be fitted with the recess 78a and the recess 79 of the lower case 2 together with the spring member 10 from the side of the lower end 7e as shown in FIG. 1. This incorporating assembly can be also performed with an automatic assembly machine.

As above-mentioned, the door member 7 can be incorporated into the tape cartridge case together with the spring member 10. Additionally, under the above temporal assembling state, as shown in FIG. 4, the curved portion 10c of the tip part 10a is positioned within the deepest wide-width portion 72c so as to be over and surround the convex portion 73. The spring member 10 at the position in FIG. 4 can be freely moved at the curved portion 10c. Even when the spring member 10 is moved in the rotating direction r and in the reversal rotating direction r' as shown in FIG. 4 at the inserting portion 72a and the thin and elongated opening 76, the spring member 10 is not detached from the position at the fitting portion 71 in FIG. 4, because the tip part 10a and the curved portion 10c are positioned at the wide-width portion 72c at a side which is deeper than the convex portion 73, so that the spring member 10 is abutted on the convex portion 73, the abutting wall 74, and the detach-preventing wall 75. Therefore, the temporal assembling state can be securely held, so that there does not occur any interference with the process of assembling the door member and thus the automatic assembly process can be securely performed. It is noted that there might occur a fear owing that the spring member 10 is abutted on the abutting wall 74 and the detach-preventing wall 75 at the tip part 10a and the curved portion 10c resulting in scratching. However, a load is small upon abutment of the spring member 10, so that even if the scratching occurs, there does not occur any problem because the scratching level lies at such a level that any interference on its function does not occur.

Next, description will be explained about an operation of the tape cartridge in FIG. 1 to FIG. 4. When the tape cartridge is mounted to the recording and reproducing apparatus, the driving axle (unshown) at the side of the apparatus approaches hereto from below in FIG. 2 penetrates through the penetrating hole 21 of the lower case 2. Thereafter, when the driving axle magnetically absorbs the metal plate 34 made of soft magnetic material at a side of the lower surface 32a of the hub portion 32, the teeth portion (unshown) of the driving axle is mated with the engaging teeth 34a of the hub portion 32. Further, the projecting portion (unshown) of the teeth portion of the driving axle allows the brake-releasing member 6 to be moved upwardly using the leg portion 6b, resulting in that the brake-locking member 5 is moved to a non-locked position and the engagement of the teeth portion 51 with the teeth portion 35 at the hub portion is released, so that the tape reel 3 can be rotated.

When the tape cartridge is not used (not mounted), the spring member 10 always biases the door member 7 in the biasing direction F in FIG. 2, because the curved portion 10c of the tip part 10a is abutted on the abutting wall 74 of the door member 7 while the other end 10d is abutted on the end surface 79a of the recess 79 and positioned within the recesses 79, 78a under a compressed state between the abutting wall 74 and the end surface 79a. By this biasing, the door member 7 is closed so as to be abutted on an abutting surface 80a at the vicinity of the opening portion 78, and further the opening portion 78 of the tape cartridge is closed.

And, when the tape cartridge is mounted to the apparatus as above-mentioned, the engaging portion 80 of the door member 7 is engaged with an opening member (unshown) of the apparatus, so that the door member 7 is moved against the biasing forth by compression using the spring member 10 and being guided using the recesses 78a, 79 and the like in the opposite direction F' of the biasing direction F in the drawing. The opening portion 78 of the tape cartridge is opened in accompanying with the movement of the door member 7. Further, next, a holding member (unshown) at the side of the apparatus holds the leader member 8 from the opening portion 78 and thereafter the magnetic recording tape is pulled out to the apparatus side, resulting in that recording or reproducing with the magnetic recording tape can be performed.

Further, as above-mentioned, when the door member 7 is biased by the spring member 10 to be moved in the biasing direction F and in the reverse biasing direction F' while the curved portion 10c of the spring member 10 is being abutted on the abutting wall 74 of the fitting portion 71, the spring member 10 biases the door member 7 during rotating freely in the rotation direction r and the reverse direction r' as shown in FIG. 4.

According to the tape cartridge in FIG. 1 to FIG. 4, in comparison with the conventional arts as shown in FIG. 6 and FIG. 7, the temporal assembling between the spring member and the door member can be readily performed, so that the assembling performance is enhanced, the working process by a hand as conventional can be automated, and the temporal assembling state can be securely held, so that there does not occur any defect such that the temporal assembling is again performed. Thus, the producing cost of the tape cartridge can be reduced.

Further, the tip part of the spring member is not constituted so as to be contacted with the inner wall at the side of the case as shown in FIG. 6, so that there does not occur any problem of sliding defect or scratching of the wall by the contact. Further, as shown in FIG. 7, the configuration is complicated that the inserting opening is provided at the conventional door member and therefore the configuration of the metal mold becomes complicated, resulting in that more cost of the metal mold is required. According to the present embodiment, the fitting portion of the door member is simple on its configuration, so that the configuration of the metal mold becomes relatively simple and the cost of the metal mold can be reduced.

Figure 8:
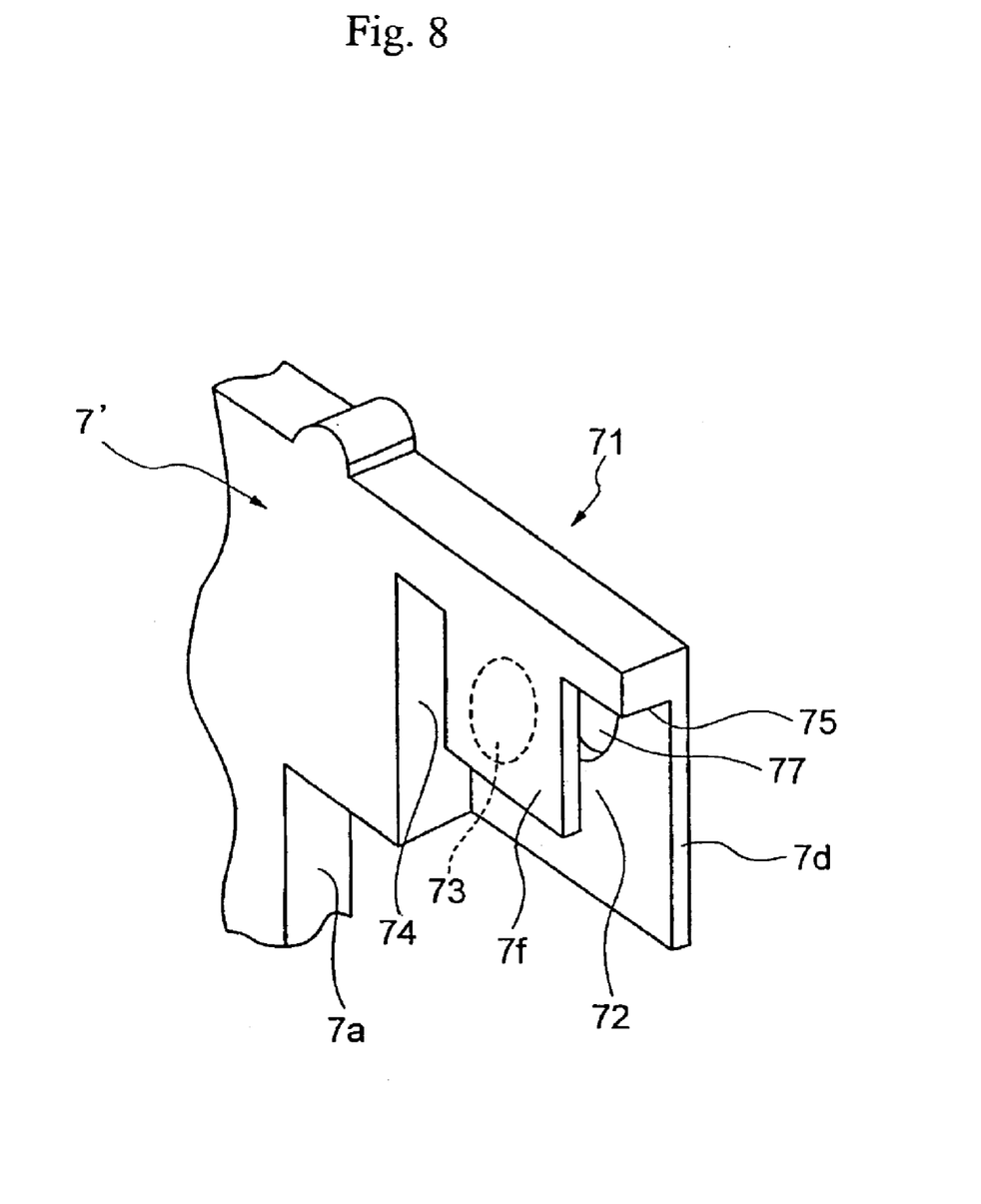
FIG. 8 is a perspective view seen from the reverse side of FIG. 2 showing the modified example of the door member in FIG. 2.

Next, description will be explained about a modified example of the door member in FIG. 2, referring to FIG. 8. FIG. 8 is a perspective view seen from the reverse side of FIG. 2 showing another example of the door member. A door member 7' in FIG. 8 is formed by allowing the thinner portion 7c at the fitting portion 71 of the door member 7 in FIG. 2 to be smaller in its plane direction. Namely, as shown in FIG. 8, a thinner portion 7f at which the dome-shaped convex portion 73 is formed is totally smaller than the thinner portion 7d which sandwiches the space portion 72 with the thinner portion 7f and opposes to the thinner portion 7d. The configuration of the door member 7' in FIG. 8 is preferable because the door member 7' is molded using a metal mold without slide core.

Figure 5:
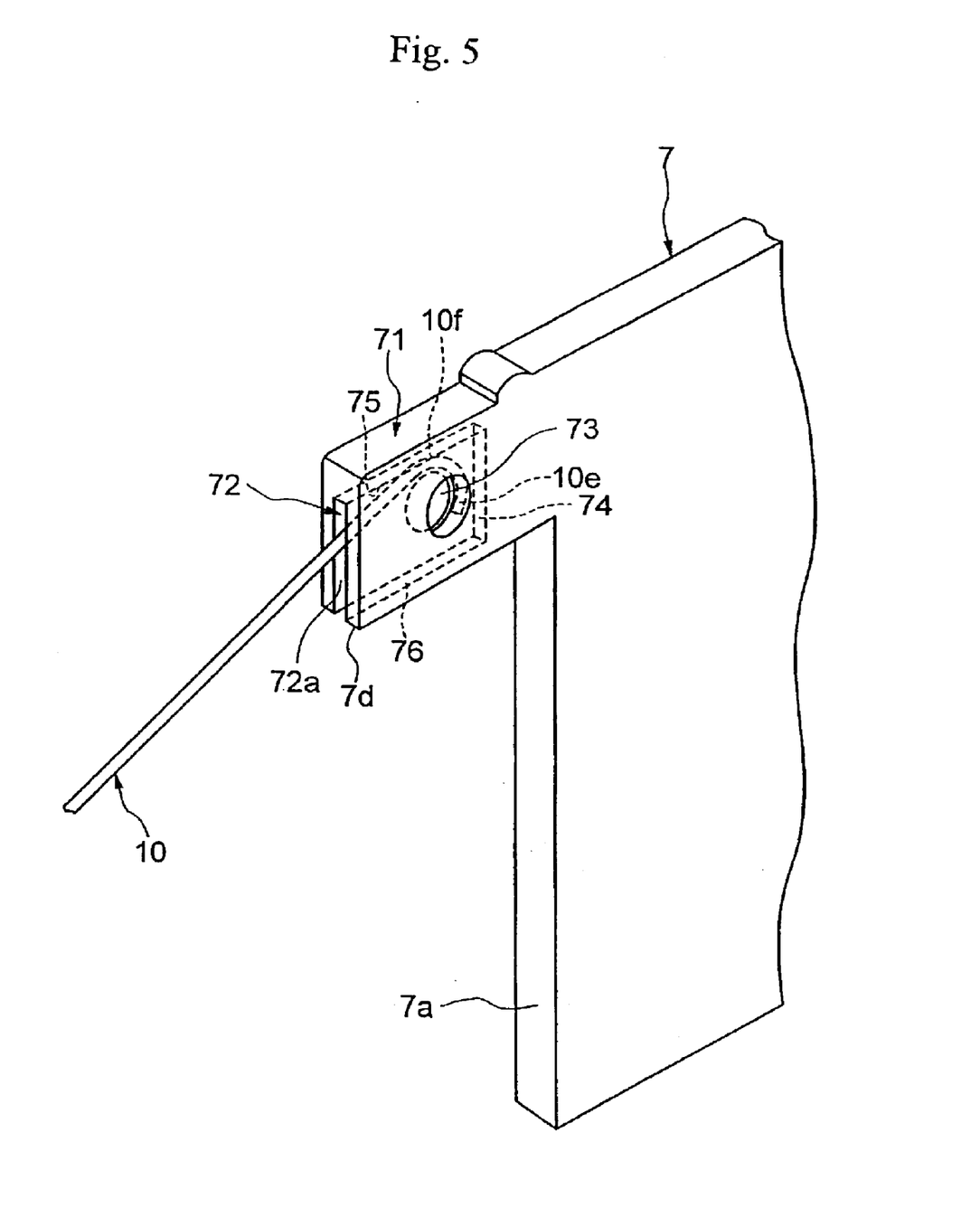
FIG. 5 is a perspective view showing a modified example with respect to FIG. 4.

As above-mentioned, the present invention has been explained with the embodiments. However, the present invention is not limited to them. Namely, various kinds of modifications can be applied within a scope of technical invention of the present invention. For example, the curved portion at the tip part of the spring member 10 may be curved in a direction as shown in FIG. 5 (which is the opposite direction as shown in FIG. 4) at the fitting portion 71. In other words, the spring member 10 is roundly curved from the tip end 10e to the curved portion 10f and positioned so as to surround the convex portion 73 at the deepest wide-width portion 72c of the fitting portion 71. When the spring member biases the door member 7, a portion from the tip end 10e to the curved portion 10f is abutted on the abutting wall 74. According to the configuration in FIG. 5, the spring member 10 can be temporally assembled against the door member 7 readily and securely, and such an effect as obtained by the configuration as shown in FIG. 2 to FIG. 4 can be obtained.

Additionally, in the space portion 72 of the fitting portion 71 as shown in FIG. 2 to FIG. 4, the abutting wall 74 and the detach-preventing wall 75 are constituted in a linear manner. However, they may be constituted in a circle manner or an ellipse manner. The convex portion 73 may be formed in any manner other than a dome manner. Further, the tape cartridge is not limited to one-reel typed one. Needless to say, the other typed tape cartridge may be employed in which a substantial same opening portion may be opened and closed using the door member.

As above, according to the present embodiments, a tape cartridge can be provided, in which assembling performance of the spring member which biases the door member for opening and closing the opening portion and the door member can be enhanced, the assembly process can be automated, and there is no interference with sliding motion of the door member. Additionally, a producing method can be provided, which can reduce the producing cost of such a tape cartridge.

What is claimed is:

1. A tape cartridge comprising:

a tape reel around which a sheet-like recording medium is wound;

a door member for opening and closing an opening in the cartridge through which the recording medium can be pulled out from the tape reel;

a spring member for biasing the door member to close the opening;

wherein the door member is provided with a concave fitting portion into which a tip part of the spring member can be pushed and fitted; and wherein the concave fitting portion is adapted to be elastically deformed when the tip part of the spring member is pushed in, thereby permitting said tip part to be fitted.

2. The tape cartridge according to claim 1, wherein the concave fitting portion has an abutting wall against which the tip part of a fitted spring member abuts when biasing the door member.

3. The tape cartridge according to claim 1, wherein the concave fitting portion has a convex portion therein so that a space where the tip part is pushed in is partially narrowed in its width.

4. The tape cartridge according to claim 3, wherein the spring member is constructed of wire material, and a width of a space that is normal to a direction the tip part is pushed in is smaller at said convex portion than a diameter of a section of the spring member in the space and larger than the diameter of the section of the spring member other than at the convex portion.

5. The tape cartridge according to claim 3, wherein the concave fitting portion has a space having a width wider than the width at the convex portion so that the tip part of the spring member can be freely moved within the space when fitted over the convex portion.

6. The tape cartridge according to claim 3, wherein an opening which is opposed to the convex portion is provided in one of the walls of the concave fitting portion.

7. The tape cartridge according to claim 1, wherein said concave fitting portion has a detach-preventing wall for preventing the tip part of a fitted spring member from being unintentionally detached from the fitting portion.

8. A method of producing a tape cartridge of claim 1, comprising the steps of:

assembling the spring member to the door member by pushing the tip part of the spring member into the fitting portion; and incorporating the door member into the cartridge.

9. The tape cartridge according to claim 1, wherein the concave fitting portion has a space into which the tip part can be fitted and a portion of the space is narrowed in width.

10. The tape cartridge according to claim 9, wherein the width of the space is larger than the width of the tip part except that the width of the narrowed portion of the space is smaller than the width of the tip part.

* * * * *

UNITED STATES PATENT AND TRADEMARK OFFICE
CERTIFICATE OF CORRECTION

PATENT NO. : 6,843,440 B2
DATED : January 18, 2005
INVENTOR(S) : Takateru Satoh et al.

It is certified that error appears in the above-identified patent and that said Letters Patent is hereby corrected as shown below:

<u>Title page,</u>
Item [54], Title, please delete "TAPE CARTRIDGE PRODUCING AND METHOD THEREOF" and substitute -- TAPE CARTRIDGE AND PRODUCING METHOD THEREOF --.

Signed and Sealed this

Twenty-sixth Day of April, 2005

JON W. DUDAS
*Director of the United States Patent and Trademark Office*